(12) United States Patent
Lovett et al.

(10) Patent No.: US 9,878,948 B2
(45) Date of Patent: Jan. 30, 2018

(54) COMPOSITIONS AND METHODS FOR THE INTRODUCTION OF REINFORCEMENT FIBERS IN PORTLAND AND ASPHALT CEMENT CONCRETE

(71) Applicant: FORTA CORPORATION, Grove City, PA (US)

(72) Inventors: Jeffrey B. Lovett, Harrisville, PA (US); Clifford Norman MacDonald, Inver Grove Heights, MN (US); Tracy H. Lang, Mercer, PA (US)

(73) Assignee: Forta Corporation, Grove City, PA (US)

( * ) Notice: Subject to any disclaimer, the term of this patent is extended or adjusted under 35 U.S.C. 154(b) by 0 days.

(21) Appl. No.: 14/209,220

(22) Filed: Mar. 13, 2014

(65) Prior Publication Data

US 2014/0303288 A1    Oct. 9, 2014

Related U.S. Application Data

(60) Provisional application No. 61/787,255, filed on Mar. 15, 2013, provisional application No. 61/787,285, filed on Mar. 15, 2013.

(51) Int. Cl.
| | |
|---|---|
| *C04B 26/26* | (2006.01) |
| *C04B 28/04* | (2006.01) |
| *C04B 20/00* | (2006.01) |
| C04B 103/00 | (2006.01) |
| C04B 111/00 | (2006.01) |

(52) U.S. Cl.
CPC .......... *C04B 26/26* (2013.01); *C04B 20/0052* (2013.01); *C04B 28/04* (2013.01); *C04B 2103/0077* (2013.01); *C04B 2111/0075* (2013.01)

(58) Field of Classification Search
CPC ............ C04B 16/0691; C04B 16/0633; C04B 16/0625; C04B 28/04; C04B 26/26
See application file for complete search history.

(56) References Cited

U.S. PATENT DOCUMENTS

| 5,296,025 A | 3/1994 | Basin et al. |
|---|---|---|
| 5,460,649 A | 10/1995 | Strassman |
| 5,529,247 A * | 6/1996 | Mleczewski .......... E01C 19/104 222/227 |
| 5,628,822 A * | 5/1997 | Hogan ................ C04B 20/0052 106/644 |
| 2004/0192141 A1 | 9/2004 | Yang et al. |
| 2011/0117303 A1* | 5/2011 | MacDonald ............ C04B 16/06 428/36.3 |

FOREIGN PATENT DOCUMENTS

| EP | 0 032 421 A1 | 7/1981 |
|---|---|---|
| JP | 2000248280 A | 9/2000 |
| JP | 2001115035 A | 4/2001 |
| WO | 9428219 A1 | 8/1994 |
| WO | 02/00566 A1 | 1/2002 |

OTHER PUBLICATIONS

International Search Report for corresponding PCT application PCT/US14/30127, dated Aug. 1, 2014.
Tatsumi, K. "Fiber-cement compositions for high-strength building materials" Chemical Abstracts, Feb. 8, 1988, p. 334, vol. 108, No. 6.
European Patent Office, Extended European Search Report for European Application No. 14763993.4, dated Oct. 27, 2016.

* cited by examiner

*Primary Examiner* — Lanee Reuther
(74) *Attorney, Agent, or Firm* — Eckert Seamans Cherin & Mellott, LLC; Carol A. Marmo

(57) ABSTRACT

The present invention relates to a blend of reinforcement fibers for use in a variety of applications. In particular, the blend of reinforcement fibers can be used in cementitious compositions, such as Portland cement concrete and asphalt cement concrete compositions to reduce or preclude voids and/or cracks formed in the cement concrete upon placement. The blend of reinforcement fibers includes a plurality of first fibers and a plurality of different second fibers. The first and second fibers can be different based on coarseness/fineness, melting temperature, denier and specific chemical or material composition. In certain embodiments, one of the plurality of first fibers and the plurality of different second fibers has a melting temperature that is lower than the temperature of an asphalt cement concrete composition such that the plurality of first or different second fibers serves as a carrier/buffer to improve distribution and dispersion of the fibers in the Portland or asphalt cement concrete composition.

6 Claims, No Drawings

COMPOSITIONS AND METHODS FOR THE INTRODUCTION OF REINFORCEMENT FIBERS IN PORTLAND AND ASPHALT CEMENT CONCRETE

CROSS REFERENCE TO RELATED PATENT APPLICATIONS

This patent application claims the benefit of priority under 35 U.S.C. §119(e) from U.S. Provisional Patent Application No. 61/787,255 entitled "METHODS OF INTRODUCING REINFORCEMENT FIBERS INTO ASPHALT COMPOSITIONS", filed on Mar. 15, 2013; and U.S. Provisional Patent Application No. 61/787,285 entitled "METHODS OF INTRODUCING REINFORCEMENT FIBERS INTO PORTLAND CEMENT CONCRETE", filed on Mar. 15, 2013; which are incorporated in their entirety herein by reference.

FIELD OF THE INVENTION

The present invention relates to a plurality of reinforcement fibers and methods of introducing and distributing the reinforcement fibers into concrete compositions, such as Portland cement concrete and asphalt cement concrete. In particular, the plurality of reinforcement fibers include a blend of at least two different reinforcement fibers. Further, in particular, the methods include employing an air or pneumatic transport device to introduce and distribute the reinforcement fibers into Portland cement concrete and asphalt cement concrete prior to its field placement.

BACKGROUND OF THE INVENTION

Various reinforcement fibers and their use in a wide variety of applications are known in the art. For example, it is known to add reinforcement fibers to building materials, such as concrete, including Portland cement concrete, asphalt cement concrete and the like, to add strength, toughness, and durability, and to improve the integrity of the cement properties. In some applications, reinforcement fibers are added to concrete to reduce or prevent cracks. Typical reinforcement fibers include asbestos fibers, glass fibers, steel fibers, mineral fibers, natural fibers, synthetic fibers, such as polymer and aramid fibers, elastane fibers, and cellulose fibers. Some reinforcement fibers are better suited for particular applications than others. For example, asbestos fibers are known to provide effective reinforcement but, due to environmental and health concerns these fibers, are not extensively used. In addition, some fibers are relatively expensive and therefore, not practical for all applications.

Reinforcement fibers are incorporated into the building materials, such as Portland cement concrete and asphalt cement concrete, using a variety of conventional methods and techniques. For example, it is known to add reinforcement fibers to Portland cement concrete and asphalt cement concrete during the manufacturing process prior to field placement. For example, in a batch process wherein a mixing machine is used to produce concrete, reinforcement fibers are added to a mixing chamber having mixing blades, with other ingredients. A continuous process uses a drum mixer and the reinforcement fibers are added to the drum mixer. When asphalt cement concrete is produced, the reinforcement fibers are typically added to the mixer prior to the introduction of liquid asphalt. Further, the reinforcement fibers may be added to equipment other than the mixing chamber and the drum mixer. In general, the reinforcement fibers may be added to any associated machinery located either up-line or down-line from the mixing machine or the drum mixer provided that the machinery has the capability to provide sufficient mixing and dispersion of the reinforcement fibers in the asphalt composition.

The reinforcement fibers are added to a cement concrete composition either individually or in a bundle or in a container. Generally, it is advantageous for the reinforcement fibers to be added in a manner that is effective to reduce or minimize entanglement and clumping, and to improve or maximize distribution throughout the composition.

Further, reinforcement fibers can be added to a cement concrete composition in varying amounts. Typically, the amount added is such that desired properties of the reinforced concrete are achieved upon field placement.

There are disadvantages associated with the known methods for introducing reinforcement fibers into Portland and asphalt cement concrete compositions. For example, there is room for improvement in introducing reinforcement fibers, e.g., having a length of ½" or greater, such that they are easily dispersed and uniformly distributed in the cement concrete composition, and provide improved strength, durability and toughness in the reinforced concrete upon its field placement.

SUMMARY OF THE INVENTION

In one aspect, the present invention provides a reinforcement composition for cement concrete. The composition includes a blend of reinforcement fibers including a plurality of first fibers and a plurality of different second fibers. The blend of reinforcement fibers is introduced and distributed into the asphalt cement concrete prior to its field placement.

In certain embodiments, the plurality of first fibers can be fine as compared to the coarser plurality of different second fibers.

Further, in certain embodiments, the plurality of first fibers can have a higher melt temperature as compared to the melt temperature of the plurality of different second fibers. The plurality of different second fibers can be meltable in the asphalt cement concrete composition.

Furthermore, in certain embodiments, the plurality of first fibers can be selected from the group consisting of carbon, aramid, elastane, nylon and polyester fibers. The plurality of different second fibers can be polyolefin fibers selected from polyethylene fibers, polypropylene fibers and, co-polymers and mixtures thereof.

Moreover, in certain embodiments, the plurality of first fibers can have a low denier as compared to the higher denier of the plurality of different second fibers.

The blend of reinforcement fibers can be in a form selected from the group consisting of individual fibers, a bundle of fibers, a container of fibers and combinations thereof. When the blend of reinforcement fibers is in the form of a container, the container can include a core which includes the plurality of first fibers and/or the plurality of second fibers and an outer layer encompassing the core. The outer layer can be constructed of a material including polyolefin, such as polypropylene, polyethylene and, co-polymers and mixtures thereof.

The plurality of different second fibers can serve as a carrier/buffer material for the plurality of first fibers, allowing conveyance of the plurality of first fibers in an undistributed form.

The plurality of different second fibers can be coarser than the plurality of first fibers.

The plurality of first fibers can have a denier from 0.25 to 100 per individual filament. The plurality of different second fibers can have a denier from 50 to 10,000 per individual filament.

Each of the plurality of first fibers and the plurality of different second fibers can be present in an amount of from about 5% to about 95% by weight based on total weight of the blend of reinforcement fibers.

In another aspect, the present invention provides a method of introducing and distributing reinforcement fibers into a cement concrete composition. The method includes obtaining a blend of reinforcement fibers as described above, employing an air or pneumatic transport device, feeding the blend of reinforcement fibers into the air or pneumatic transport device, discharging the blend of reinforcement fibers from the air or pneumatic transport device and, introducing and distributing the blend of reinforcement fibers into the cement concrete composition prior to its field placement.

The blend of reinforcement fibers can be in a form selected from the group consisting of individual fibers, a bundle of fibers, a container of fibers and combinations thereof. When the blend of reinforcement fibers is in the form of a bundle or container, each of the bundle or container may include a plurality of first fibers, a plurality of second fibers, or a blend of first and second fibers.

In another aspect, the present invention provides a method of producing reinforced cement concrete. The method includes providing aggregate, providing a blend of reinforcement fibers as described above, employing an air or pneumatic transport device, feeding the blend of reinforcement fibers into the air or pneumatic transport device, discharging the blend of reinforcement fibers from the air or pneumatic transport device and, introducing and distributing the blend of reinforcement fibers into the aggregate to produce reinforced cement concrete.

When the reinforced cement concrete is asphalt cement concrete, the blend of reinforcement fibers is added to the aggregate prior to the addition of liquid asphalt.

The plurality of first fibers can have the same shape or different shapes and the plurality of different second fibers can have the same or different shapes. The plurality of first fibers and the plurality of second fibers can each include fibrillated fibers, non-fibrillated fibers, monofilament fibers, multifilament fibers or a mixture thereof.

DETAILED DESCRIPTION OF THE INVENTION

The present invention relates to a blend of reinforcement fibers and, their introduction and distribution into cement concrete compositions, such as asphalt cement concrete and Portland cement concrete compositions, prior to field placement. Generally, a plurality of reinforcement fibers are added to cement concrete to produce reinforced cement concrete which can be field placed and used in a wide variety of applications. In accordance with the present invention, a blend of reinforcement fibers provides for mechanical and chemical reinforcement of the asphalt. Without intending to be bound by any particular theory, it is believed that the use of a blend of at least two different reinforcement fibers increases the adhesion between the fibers and within the cement concrete such that the fibers essentially hold together broken cement concrete.

As used herein and the claims, the term "fiber" is meant to include those materials that are traditionally understood by one of ordinary skill in the art to constitute a fiber as well as materials having an aspect ratio from 20 to 5,000.

Further, as used herein and the claims, the term "air or pneumatic transport device" is meant to include blowing devices, fiber metering devices (FMDs), vacuum devices and combinations thereof, such as those known in the art and commercially available.

Two types of cement are Portland cement concrete and asphalt cement concrete. As used herein and the claims, the term "cement concrete" means asphalt cement concrete and Portland cement concrete. As used herein and the claims, the term "asphalt" means asphalt cement concrete. The term "asphalt cement concrete" refers to the use of asphalt cement. The term "Portland cement concrete" refers to the use of Portland cement. The term "cement" refers to the binder that holds together the concrete. As used herein, the cement also can be referred to as "binder" or "liquid asphalt." The term "concrete" refers to a gradation of fine and coarse aggregate, such as, but not limited to sand and rock.

In the present invention, the reinforcement fibers include a blend of at least two different fibers. The blend includes a plurality of first fibers and a plurality of different second fibers. In accordance with the invention, one plurality of fibers can serve as a carrier or buffer for the other plurality of fibers. For example, the different second fibers can serve as a carrier or buffer for the first fibers. Without intending to be bound by any particular theory, it is believed that the presence of carrier or buffer fibers in the blend results in improved distribution and dispersion of the blend of fibers in an asphalt cement concrete composition.

In certain embodiments, the second fibers differ from the first fibers because of the coarseness or fineness of the fibers. For example, the plurality of second fibers can be coarser or finer than the plurality of first fibers.

Further, in certain embodiments, the second fibers can differ from the first fibers due to a difference in melting temperature. The second fibers may have a higher or lower melting temperature than the first fibers. For example, the first fibers can have a melting temperature from 325° F. to 900° F. and the second fibers can have a melting temperature from 150° F. to 350° F.

In certain embodiments, wherein the blend of reinforcement fibers includes a plurality of fibers which have a melting temperature that is less than the temperature of the asphalt cement concrete composition and a plurality of fibers which have a higher melting temperature, the "meltable" fibers can serve as a carrier to the other fibers and enhance the adhesion between the fibers and the resulting asphalt cement concrete.

Furthermore, in certain embodiments, the second fibers differ from the first fibers due to a difference in denier. The second fibers may have a higher or lower denier than the first fibers. For example, the denier of the first fibers can be from 0.25 to 100 per individual filament and the denier of the second fibers can be from 50 to 10,000 per individual filament.

Moreover, in certain embodiments, the second fibers can differ from the first fibers due to material composition. For example, the second fibers can include polyolefin fibers and the first fibers can include fibers selected from carbon, aramid, nylon, elastane, polyester and mixtures thereof.

In certain embodiments of the present invention, the plurality of second fibers includes polyolefin fibers, such as but not limited to polyethylene fibers, polypropylene fibers and, co-polymers and mixtures thereof, and the plurality of first fibers includes aramid fibers.

The methods of introducing and distributing the blend of reinforcement fibers into the cement concrete prior to field placement include conventional methods that are known in the art. In accordance with certain embodiments of the invention, the blend of reinforcement fibers is introduced into the cement concrete prior to field placement using various methods and techniques. The blend including the plurality of first fibers and the plurality of different second fibers can be introduced into the cement concrete during one or more of various steps or locations in the manufacture process. For example, the blend of reinforcement fibers can be added to a mixing machine or associated machinery, in a hopper, or in a transportation vehicle. In general, the blend of reinforcement fibers can be added at any step or location in the process prior to field placement provided there is sufficient mixing that occurs in the step or at the location to adequately incorporate the blend of reinforcement fibers into the cement concrete composition.

The blend of reinforcement fibers can be added as individual fibers or in bundles and containers to the cement concrete composition during its manufacturing process. When added in containers, each container can hold a blend of reinforcement fibers (i.e., a plurality of first fibers and a plurality of second fibers) or each container can hold either first fibers or different second fibers.

In addition, in certain embodiments, the blend of reinforcement fibers can be introduced and distributed into the cement concrete through the use of an air or pneumatics, e.g., an air or a pneumatic transport device. In these embodiments, the blend of reinforcement fibers can be essentially blown into the cement concrete composition. Suitable devices are known in the art and can be employed as-is or can be adapted for use in accordance with the present invention. A plurality of first fibers and a plurality of individual different second fibers are fed or charged into the transport device and the transport device is operable to discharge the blend of reinforcement fibers into the cement concrete composition. The plurality of first fibers and plurality of different second fibers are typically mixed together in close contact in order to achieve improved dispersion.

Without intending to be bound by any particular theory, it is believed that employing the mechanism of air or pneumatics (as compared to, for example, manual addition) to incorporate the blend of reinforcement fiber into the cement concrete provides improved distribution and dispersion of the reinforcement fibers throughout the cement concrete.

The blend of reinforcement fibers can be fed or charged into the transport device in various forms. For example, the blend can be in the form of individual fibers or groupings of fibers, such as, bundles or containers. When the blend of reinforcement fibers are in the form of bundles or containers, in certain embodiments, each bundle or container can include a plurality of first fibers and a plurality of different second fibers. In certain other embodiments, each bundle or container can include only a plurality of first fibers or only a plurality of different second fibers such that a blend of bundles or containers are fed or charged into the transport device to provide a blend of reinforcement fibers into the cement concrete.

In certain embodiments, the container can be constructed of a core and an outer layer. The core includes reinforcement fibers selected from a plurality of first fibers, a plurality of different second fibers and blends thereof. The outer layer can be constructed of various materials which are operable to hold the blend of reinforcement fibers and then to release them as needed. Non-limiting examples of suitable materials of construction for the outer layer include cellulose and polyolefin, such as polyethylene, polypropylene and, co-polymers and mixtures thereof. The composition of the outer layer can further include other additives, such as those typically used in preparing cement concrete and/or those known to produce advantages to the process and/or beneficial properties in the resultant cement concrete. The outer layer can also include other components, such as but not limited to, a plurality of first fibers and/or a plurality of different second fibers, or some other fibers. In certain embodiments, the outer layer includes amine. The amine can be selected from a wide variety of amines known in the art.

Without intending to be bound by any theory, it is believed that upon introducing the container into an asphalt cement concrete composition, the outer layer will at least partially melt, dissolve and/or disintegrate to release its contents, i.e., the core having the blend of reinforcement fibers and optionally other additives for dispersion and distribution in the asphalt cement concrete composition. Further, the materials from which the outer layer is constructed also will be dispersed and distributed within the asphalt mixture. Further, it is believed that upon introducing the container into a Portland cement concrete composition, the outer layer will at least partially break apart to release its contents, i.e., the core having the blend of reinforcement fibers and optionally other additives for dispersion and distribution in the Portland cement concrete composition.

The blend of reinforcement fibers is typically introduced during one of various steps or locations throughout the preparation process prior to field placement of the cement concrete. Typically, the transport device is part of, e.g., an integral part of, or is connected to one or more parts (e.g., apparatus, piping or the like) of the cement concrete manufacturing equipment. Further, the transport device typically includes an input reservoir or pipe to receive the blend of reinforcement fibers and an output tube or pipe to discharge and feed the blend of reinforcement fibers into the cement concrete.

Without intending to be bound by any particular theory, it is believed that the addition of entangled fibers into a fiber transport device (or other fiber feed or fiber addition device) does not result in the fibers becoming un-entangled as the fibers move through the device. Fibers that are entangled upon addition to the transport device remain entangled through conveyance into the cement concrete composition. Further, it is believed that entangled fibers added into a cement concrete composition do not simply un-entangle as a result of mixing. Thus, it is desired to provide un-entangled fibers into the transport device or into the cement concrete composition such that the distribution of the un-entangled fibers is improved in the composition and subsequently, in the reinforced cement concrete.

In accordance with the present invention, the use of a blend of reinforcement fibers including a plurality of first fibers and a plurality of different second fibers can result in at least one of improved strength, durability, toughness, integrity, and the like upon field placement of the resulting reinforced cement concrete, as compared to a reinforced cement concrete produced by employing reinforcement fibers which include the same fibers, e.g., do not constitute of blend of fibers. Thus, without intending to be bound by any particular theory, it is believed that the combination of first fibers and different second fibers produce a synergistic effect relating to strength, durability, toughness, integrity and the like.

The first fibers and second different fibers for use in the present invention can be selected from those that are known in the art. The amount of each of these fibers employed can vary. In certain embodiments, the plurality of first fibers can include from 5 to 95% by weight of the blend of reinforcement fibers and the plurality of second fibers can include from 5 to 95% by weight of the blend of reinforcement fibers. In certain embodiments, an equal amount of first and second fibers can be present in the blend of reinforcement fibers and in certain other embodiments, one of the plurality of first fibers and the plurality of second fibers is present in a greater amount.

In certain embodiments, reinforcement fibers in addition to the blend of reinforcement fibers may be present in the cement concrete composition. These additional reinforcement fibers can be selected from the wide variety of reinforcement fibers that are known in the art such as, but not limited to, synthetic fibers (e.g., polymer fibers, such as polyolefin fibers, polyester fibers, elastane, polyamide fibers, polyvinyl-chloride fibers and mixtures thereof), natural fibers, and mixtures thereof.

In the present invention, the denier of the reinforcement fibers can vary. The denier can depend on the material of the reinforcement fibers, their configuration (e.g., monofilament, bundled, fibrillated, non-fibrillated, twisted, and turned), and their intended use or application.

In the present invention, the length of the reinforcement fibers can vary. In general, it is believed that longer fibers are capable of improved bonding in the asphalt cement concrete. In certain embodiments, the length of the fibers can be from ⅛ inch to 3 inches and preferably, the length of the fibers is longer than ½ inch.

Upon placement in the field, the resultant reinforced cement concrete which is prepared in accordance with the present invention exhibits three dimensional or isotropic distribution therein. This effect is particularly demonstrated along the edges of the placed cement concrete wherein a border is formed. Without intending to be bound by any particular theory, it is believed that the three dimensional or isotropic distribution demonstrates improved reinforcement in the placed cement concrete prepared in accordance with the present invention, as compared to placed cement concrete which is reinforced using reinforcement fibers that do not include a blend of a plurality of first fibers and a plurality of different second fibers, and/or a means of introduction other than air or pneumatics. Without the use of a blend of first and different second fibers and/or an air or pneumatic transport device for introducing the reinforcement fibers into the cement concrete composition, the fibers in the placed cement concrete can appear to be dispersed individually as opposed to being dispersed three dimensionally or isotropically.

Without intending to be bound by any particular theory, it is believed that the use of a blend of reinforcement fibers including a plurality of first fibers and a plurality of different second fibers results in a more uniform distribution of the fibers in a cement concrete mixture as compared to adding the plurality of first fibers in the absence of the second different fibers, i.e., adding the same fibers only. Further, it is believed that some reinforcement fibers can be difficult to distribute in a liquid mixture. For example, some reinforcement fibers have a tendency to form clumps or balls. When a blend of a plurality of first fibers and a plurality of different second fibers is employed, one of the plurality of first fibers and the plurality of second fibers can serve as a carrier to the difficult to distribute other fibers and therefore, generally improve distribution of the fibers in the cement concrete composition. For example, the blend of reinforcement fibers in accordance with the invention, allows the fibers to enter a mixer in a form that assures a complete distribution with little or no clumping or balling of fibers.

In addition to the blend of reinforcement fibers, the compounds used in producing cement concrete include, but are not limited to, aggregate and binder. For example, producing asphalt includes the use of liquid asphalt. Other additives may also be added to the cement concrete composition (for example, in the mixing machine), such as, for example, lime powder.

The process of manufacturing cement concrete can include a batch or continuous process. As described above, the blend of reinforcement fibers can be added to the cement concrete composition or mixture during the manufacturing process prior to field placement. For example, in an embodiment of a batch process, the blend of reinforcement fibers can be added to the mixing chamber (having mixing blades) of the mixing machine prior to introducing aggregate and/or binder. In an embodiment of a continuous process, a drum mixer is used and the blend of reinforcement fibers can be added to the drum mixer prior to the introduction of binder.

The manufacture of asphalt cement concrete consists of employing a thermal process and therefore, includes heating the ingredient, e.g., aggregate and liquid asphalt, in the chamber of an asphalt mixing machine. The temperature of the asphalt cement concrete composition can vary and can include those temperatures typically used in commercially-operated asphalt manufacturing facilities. In an embodiment of the present invention, the temperature can be within a range of about ambient temperatures to 375° F.

In certain embodiments, the temperature of the asphalt cement concrete composition will be higher than the melt temperature of one of the plurality of first fibers or the plurality of different second fibers. Thus, upon introduction of the blend of reinforcement fibers, one of the plurality of first fibers or the plurality of second fibers will melt. As described herein, it is believed that the "meltable" fibers can serve as a carrier for the other fibers which have a melt temperature above the temperature of the asphalt cement concrete composition.

In alternate embodiments of the process of the present invention, the blend of reinforcement fibers can be introduced and dispersed in an asphalt cement concrete composition in the asphalt mixing machine, or in associated machinery located either up-line or down-line from the mixing machine, in the form of a container. As previously described, the container may include a core and an outer layer. A transition temperature of the outer layer, i.e., the temperature at which the outer layer melts or dissolves, such as its melting point, can depend on the composition of the outer layer, e.g., the materials from which the outer layer is constructed. As the transition temperature is reached or exceeded in the asphalt or in the chamber containing the asphalt, such as the asphalt mixing machine, the outer layer melts and is dispersed within the asphalt cement concrete composition. The transition temperature can be reached or exceeded, and the outer layer can melt and be dispersed before, during, or after the mixing of the asphalt. Further, upon dispersal of the outer layer, the blend of reinforcement fibers contained within the core are released and mixed into the asphalt. As previously described, a portion of the reinforcement fibers, e.g., either the plurality of first fibers or the plurality of different second fibers, may have a transition temperature such that they can be meltable in the asphalt.

In certain embodiments, the blend of reinforcement fibers can be introduced and dispersed in a Portland cement concrete composition in a mixing machine, or in associated machinery located either up-line or down-line from the mixing machine, in the form of a container. As previously described, the container may include a core and an outer layer. The outer layer may be constructed of a material such that when subjected to mixing and/or agitation, e.g., mixing blades of the mixing machine, the outer layer at least partially breaks apart and is dispersed within the Portland cement concrete composition. Upon dispersal of the outer layer, the blend of reinforcement fibers contained within the core are released and mixed into the Portland cement.

The blend of reinforcement fibers can be added to the Portland cement concrete and asphalt cement concrete in varying amounts. Typically, the amount of the blend added is such that desired properties of the cement concrete are achieved. In certain embodiments, the blend of reinforcement fibers can be at most 5.0 percent or greater by volume per ton of the cement concrete. In yet another embodiment of the invention, the reinforcement fibers can be in a range of from about 0.0065 percent to about 5.0 percent by volume per ton of the cement concrete. Further, as discussed herein, the amount of each of the first fibers and different second fibers can vary. In certain embodiments, a one pound package, metered, dosed of the blend of reinforcement fibers is added to the cement concrete and approximately 5 to 95% of the blend can include a plurality of first fibers that have at least one of the following properties: (i) finer than the plurality of different second fibers, (ii) higher melt temperature than the plurality of different second fibers, (iii) lower denier than the plurality of different second fibers, and (iv) including carbon, aramid, elastane, nylon, polyester or mixtures thereof.

The reinforced Portland and asphalt cement concrete of the invention can be used in a wide variety of applications, for example, in structural pavements, airport runways and tarmacs, bridge deck overlays, floors, and pre-cast asphalt products. The reinforced cement concrete of the invention may also be used for repair, rehabilitation, retrofit, and renovation of existing products or structures, such as, for example, in overlays, and repairs of airport pavements, bridge decks, parking areas, roadways, and the like, including patching and filling potholes.

In addition to reinforcement, incorporation of the blend of reinforcement fibers of the present invention in, for example, cast cement concrete, modifies the cracking mechanism and reduces the propagation of micro-cracking caused by a number of factors. It is believed that relative to non-reinforced cement concrete, the resultant cracks of fiber reinforced concrete of the present invention are smaller in width, the permeability of the material is reduced, and the ultimate cracking strain is enhanced. Furthermore, the blend of fibers employed in the present invention is capable of carrying a load across the crack. As a result, the cement concrete may have at least one change in its material properties, such as toughness, residual load carrying ability after the first crack, and impact resistance. Moreover, it is believed that the blend of fibers used in the present invention produce an cement concrete having improved strength compared to non-reinforced cement concrete or cement concrete reinforced with the same fibers instead of different fibers, such that the cement concrete of the present invention can be suitable for locations where the cement concrete will experience both high and low temperatures and areas subjected to heavy loadings (e.g., high traffic areas) and heavy concentrations of truck traffic as well as many other uses.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A feed of reinforcement fibers in an air or a pneumatic transport device, the feed comprising:
   a plurality of first reinforcement fibers composed of polyolefin;
   a plurality of second reinforcement fibers composed of a material selected from the group consisting of aramid, nylon and mixtures thereof;
   a first denier in a range from 0.25 to 100 per individual filament; and
   a second denier that is different from the first denier and in a range from 50 to 10,000 per individual filament;
   wherein the first reinforcement fibers have a denier selected from the first denier and the second denier, and the second reinforcement fibers have a denier selected from the first denier and the second denier,
   wherein when the first reinforcement fibers have the first denier, the second reinforcement fibers have the second denier and when the first reinforcement fibers have the second denier, the second reinforcement fibers have the first denier, and
   wherein the feed is discharged into a cement concrete composition and the reinforcement fibers are distributed therein, prior to field placement of the cement concrete composition.

2. The feed of claim 1, wherein the reinforcement fibers are in the form of individual fibers, one or more bundles, one or more containers and combinations thereof.

3. The feed of claim 2, wherein each of the one or more containers comprises a core which comprises the reinforcement fibers and an outer layer encompassing the core, the outer layer constructed such that it is capable to at least partially dissolve, melt, disintegrate or break apart under particular conditions in order to release the reinforcement fibers contained within the core.

4. The feed of claim 2, wherein the core of each of the one or more containers comprises aramid fibers and polyolefin fibers selected from the group consisting of polyethylene fibers, polypropylene fibers and, co-polymers and mixtures thereof.

5. The feed of claim 1, wherein the plurality of polyolefin fibers is selected from the group consisting of polyethylene fibers, polypropylene fibers and, co-polymers and mixtures thereof.

6. The feed of claim 1, wherein the reinforcement fibers consist of polyethylene, aramid and nylon.

* * * * *